United States Patent
Vassilovski et al.

(10) Patent No.: US 11,792,801 B2
(45) Date of Patent: Oct. 17, 2023

(54) ROUTE-BASED SIDELINK COMMUNICATION ASSIGNMENTS

(71) Applicant: QUALCOMM Incorporated, San Diego, CA (US)

(72) Inventors: Dan Vassilovski, Del Mar, CA (US); Kapil Gulati, Belle Mead, NJ (US); Gene Wesley Marsh, San Diego, CA (US); Gabi Sarkis, San Diego, CA (US); Hong Cheng, Basking Ridge, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/444,247

(22) Filed: Aug. 2, 2021

(65) Prior Publication Data
US 2023/0032903 A1   Feb. 2, 2023

(51) Int. Cl.
*H04W 72/20* (2023.01)

(52) U.S. Cl.
CPC .................. *H04W 72/20* (2023.01)

(58) Field of Classification Search
CPC ..... H04W 72/20; H04W 28/26; H04W 92/18; H04W 4/025; H04W 4/46; H04W 64/006; H04W 4/44; G01S 1/042; G01S 5/0215; G01S 5/0205
See application file for complete search history.

(56) References Cited

U.S. PATENT DOCUMENTS

| | | | |
|---|---|---|---|
| 9,940,840 B1* | 4/2018 | Schubert | G01C 21/3407 |
| 2014/0316671 A1* | 10/2014 | Okamoto | G08G 1/22 |
| | | | 701/96 |
| 2017/0158196 A1* | 6/2017 | Park | G08G 1/096791 |
| 2017/0293296 A1* | 10/2017 | Stenneth | G06Q 20/10 |
| 2018/0324823 A1* | 11/2018 | Martin | H04W 72/121 |
| 2019/0171227 A1* | 6/2019 | Sujan | G05D 1/0295 |
| 2019/0220037 A1* | 7/2019 | Vladimerou | G08G 1/22 |
| 2019/0239181 A1 | 8/2019 | Gangakhedkar et al. | |
| 2019/0302220 A1* | 10/2019 | Kumar | H04W 4/44 |
| 2020/0127820 A1* | 4/2020 | Misoczki | H04W 12/02 |
| 2020/0150684 A1 | 5/2020 | Kim | |
| 2020/0175880 A1* | 6/2020 | Ibrahim | G08G 1/0129 |

(Continued)

FOREIGN PATENT DOCUMENTS

| | | | |
|---|---|---|---|
| EP | 3232381 A1 * | 10/2017 | ........ G01C 21/3438 |
| WO | 2020033089 A1 | 2/2020 | |
| WO | 2020034052 A1 | 2/2020 | |

OTHER PUBLICATIONS

International Search Report and Written Opinion—PCT/US2022/073144—ISA/EPO—dated Sep. 28, 2022.

*Primary Examiner* — Ayaz R Sheikh
*Assistant Examiner* — Tarell A Hampton
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may transmit route information indicating a route associated with the UE. The UE may receive, based at least in part on transmitting the route information, configuration information indicating at least one other UE assigned to the UE for sidelink positioning. Numerous other aspects are described.

30 Claims, 11 Drawing Sheets

(56) References Cited

U.S. PATENT DOCUMENTS

| | | | |
|---|---|---|---|
| 2020/0280827 A1* | 9/2020 | Fechtel | H04W 4/80 |
| 2020/0280830 A1* | 9/2020 | Stirling-Gallacher | H04B 1/3822 |
| 2020/0314732 A1* | 10/2020 | Park | H04L 5/0055 |
| 2021/0125490 A1* | 4/2021 | Yu | G08G 1/0133 |
| 2021/0166567 A1* | 6/2021 | Cuevas Ramirez | G08G 1/22 |
| 2021/0358308 A1* | 11/2021 | Li | G08G 1/22 |
| 2022/0066469 A1* | 3/2022 | Ghannam | G06Q 10/06312 |
| 2022/0292982 A1* | 9/2022 | Brandin | G08G 1/20 |

* cited by examiner

ROUTE-BASED SIDELINK COMMUNICATION ASSIGNMENTS

FIELD OF THE DISCLOSURE

Aspects of the present disclosure generally relate to wireless communication and to techniques and apparatuses for route-based sidelink communication assignments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting route information indicating a route associated with the UE. The method may include receiving, based at least in part on transmitting the route information, configuration information indicating at least one other UE assigned to the UE for sidelink positioning.

Some aspects described herein relate to a method of wireless communication performed by a communication device. The method may include receiving route information indicating a route associated with a UE. The method may include transmitting, based at least in part on receiving the route information, configuration information indicating at least one other UE assigned to the UE for sidelink positioning.

Some aspects described herein relate to a UE for wireless communication. The user equipment may include a memory and one or more processors coupled to the memory. The one or more processors may be configured to transmit route information indicating a route associated with the UE. The one or more processors may be configured to receive, based at least in part on transmitting the route information, configuration information indicating at least one other UE assigned to the UE for sidelink positioning.

Some aspects described herein relate to a communication device for wireless communication. The communication device may include a memory and one or more processors coupled to the memory. The one or more processors may be configured to receive route information indicating a route associated with a UE. The one or more processors may be configured to transmit, based at least in part on receiving the route information, configuration information indicating at least one other UE assigned to the UE for sidelink positioning.

Some aspects described herein relate to a non-transitory computer-readable medium that stores a set of instructions for wireless communication by a UE. The set of instructions, when executed by one or more processors of the UE, may cause the UE to transmit route information indicating a route associated with the UE. The set of instructions, when executed by one or more processors of the UE, may cause the UE to receive, based at least in part on transmitting the route information, configuration information indicating at least one other UE assigned to the UE for sidelink positioning.

Some aspects described herein relate to a non-transitory computer-readable medium that stores a set of instructions for wireless communication by a communication device. The set of instructions, when executed by one or more processors of the communication device, may cause the communication device to receive route information indicating a route associated with a UE. The set of instructions, when executed by one or more processors of the communication device, may cause the communication device to transmit, based at least in part on receiving the route information, configuration information indicating at least one other UE assigned to the UE for sidelink positioning.

Some aspects described herein relate to an apparatus for wireless communication. The apparatus may include means for transmitting route information indicating a route associated with the UE. The apparatus may include means for receiving, based at least in part on transmitting the route information, configuration information indicating at least one other UE assigned to the UE for sidelink positioning.

Some aspects described herein relate to an apparatus for wireless communication. The apparatus may include means for receiving route information indicating a route associated with a UE. The apparatus may include means for transmitting, based at least in part on receiving the route information, configuration information indicating at least one other UE assigned to the UE for sidelink positioning.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
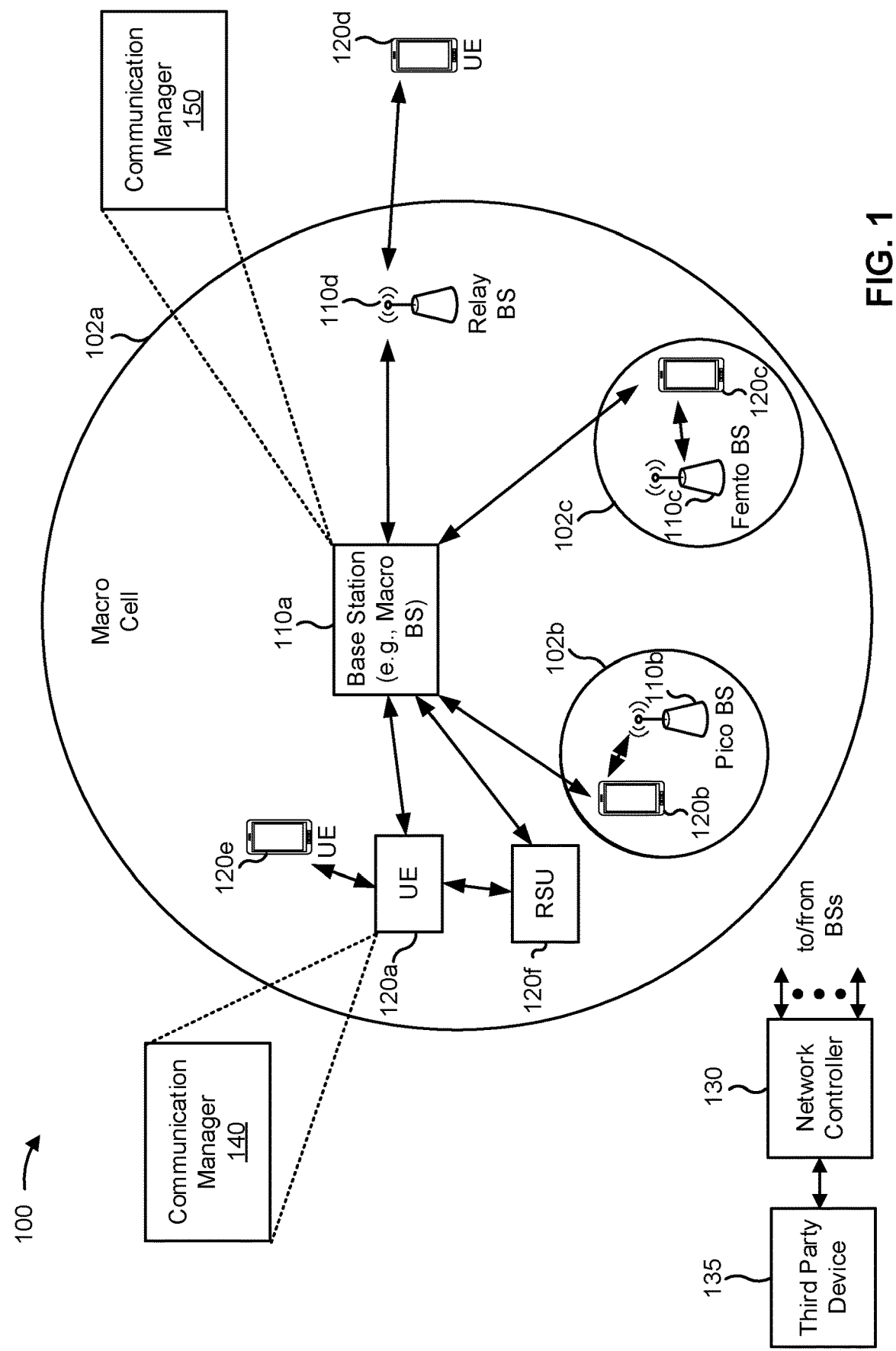
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, a UE 120e, and a roadside unit (RSU) 120f), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The network controller may include and/or be in communication with a network location server capable of performing aspects of any of the methods described herein (e.g., with reference to FIGS. 5-10). The base stations 110 may communicate with one another directly or indirectly via a wireless or wireline backhaul communication link.

A third party device 135 may communicate with the network controller 130 and may provide information to the network controller 130. For example, the third party device 135 may provide route information to the network controller 130. The third party device may also communicate with UEs 120 and/or base station 110 to obtain route the route information. For example, the third party device 135 may be a computing device associated with a navigation service used by a UE to navigate from one location to another, a weather service used to identify and/or predict weather associated with a location, a traffic service used to determine and/or predict traffic conditions associated with a location, and/or the like.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, an RSU, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a, UE 120e, and RSU 120f) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110. In some aspects, the RSU 120f type of UE 120 may communicate with other devices of the wireless network 100 (e.g., via wired and/or wireless communications). As used herein, an RSU is intended to be broadly construed as a type of UE; where an RSU is described as performing an action or being capable of performing an action, another type of UE may also perform the action or be capable of performing the action. Similarly, where a UE is described as performing an action or being capable of performing an action, an RSU (or another type of UE) may also perform the action or be capable of performing the action.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit route information indicating a route associated with the UE. The communication manager 140 may receive, based at least in part on transmitting the route information, configuration information indicating at least one other UE assigned to the UE for sidelink positioning. Additionally, or alternatively, the communication manager 140 may perform one or more other operations described herein.

In some aspects, the communication device may include a communication manager (e.g., communication manager 140 for a UE type, or communication manager 150 for a base station type). As described in more detail elsewhere herein, the communication manager 150 may receive route information indicating a route associated with a UE. The communication manager 150 may transmit, based at least in part on receiving the route information, configuration information indicating at least one other UE assigned to the UE for sidelink positioning. Additionally, or alternatively, the communication manager 150 may perform one or more other operations described herein.

As indicated above, FIG. 1 is provided as an example. Other examples may differ from what is described with regard to FIG. 1.

Figure 2:
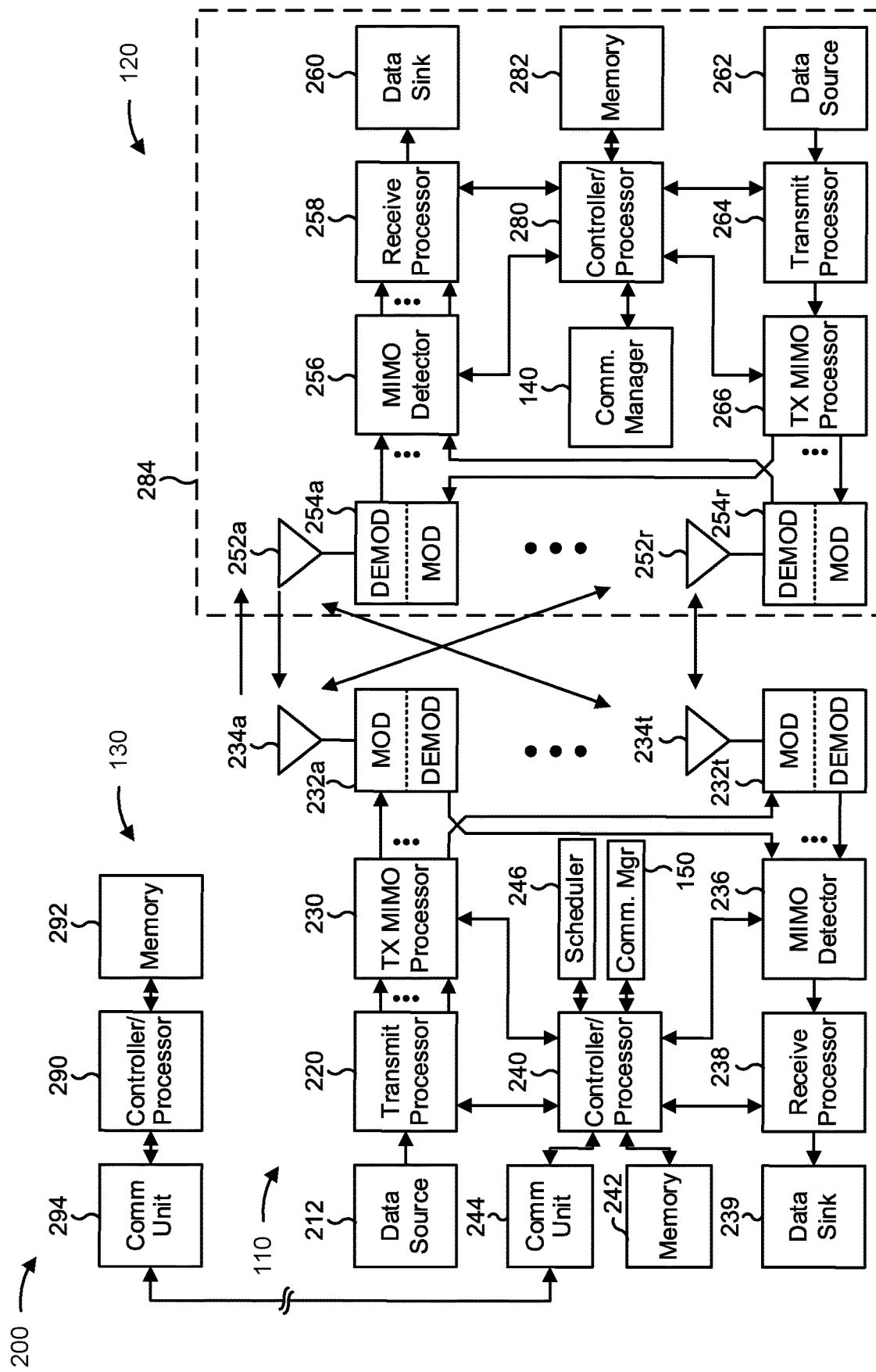
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM) and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, the controller/processor 290 of the network controller 130, and/or any other component(s) of FIG. 2 may perform one or more techniques associated with route-based sidelink communication assignments, as described in more detail elsewhere herein. For example, the controller/processor 240 of the base station 110, the controller/processor 280 of the UE 120, the controller/processor 290 of the network controller 130, and/or any other component(s) of FIG. 2 may perform or direct operations of, for example, process 800 of FIG. 8, process 900 of FIG. 9, and/or other processes as described herein. The memory 242, the memory 282, and the memory 292 may store data and program codes for the base station 110, the UE 120, and the network controller 130, respectively. In some examples, the memory 242, the memory 282, and/or the memory 292, may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the UE 120, and/or the network controller 130, may cause the one or more processors, the UE 120, the base station 110, and/or the network controller 130 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for transmitting route information indicating a route associated with the UE; and/or means for receiving, based at least in part on transmitting the route information, configuration information indicating at least one other UE assigned to the UE for sidelink positioning. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the communication device includes means for receiving route information indicating a route associated with a UE; and/or means for transmitting, based at least in part on receiving the route information, configuration information indicating at least one other UE assigned to the UE for sidelink positioning. In some aspects, the means for the communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the communication device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
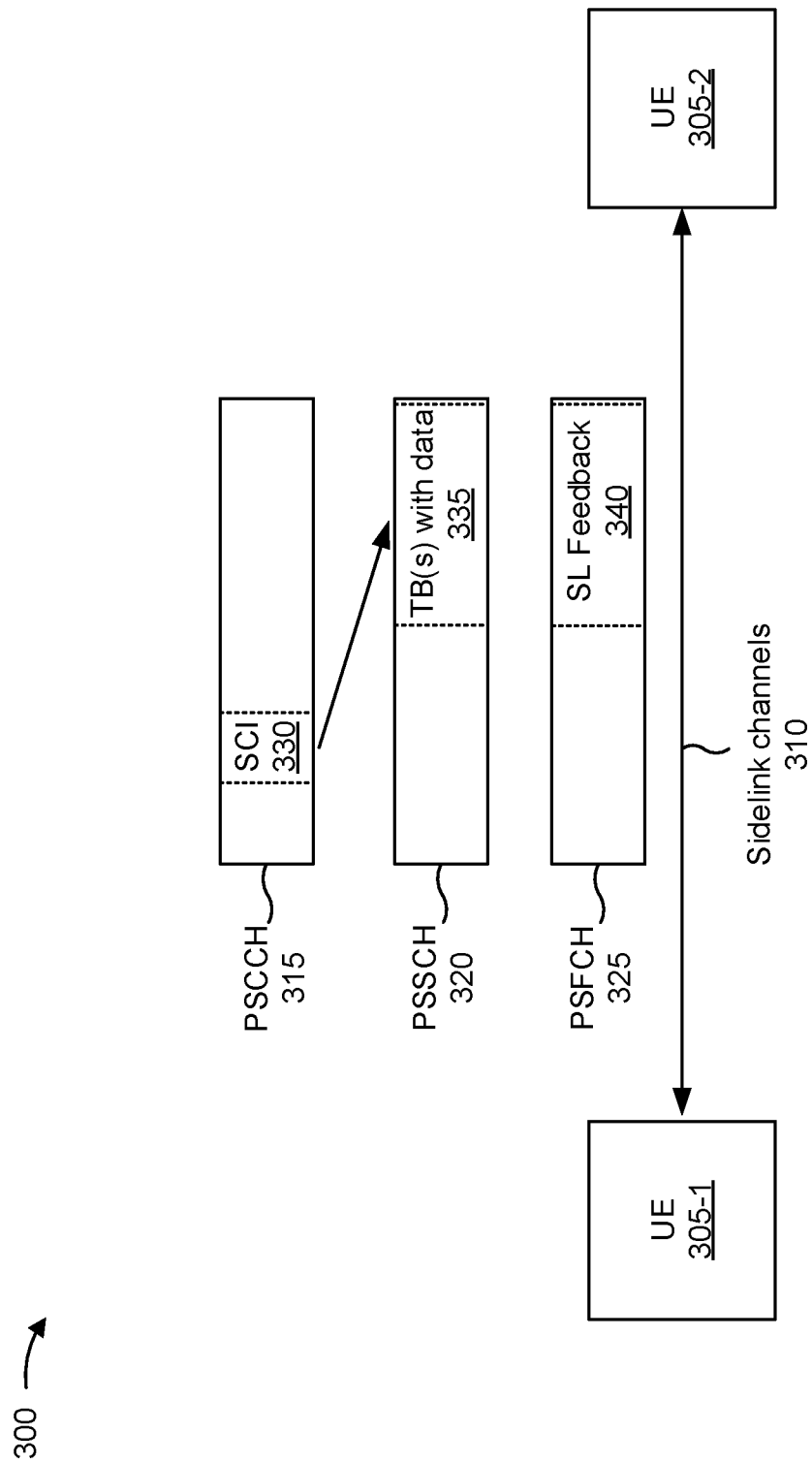
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120, and may include different types of UEs, such as vehicular UEs (e.g., UEs integrated in or otherwise associated with a vehicle) and/or RSUs, among other examples. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARM) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
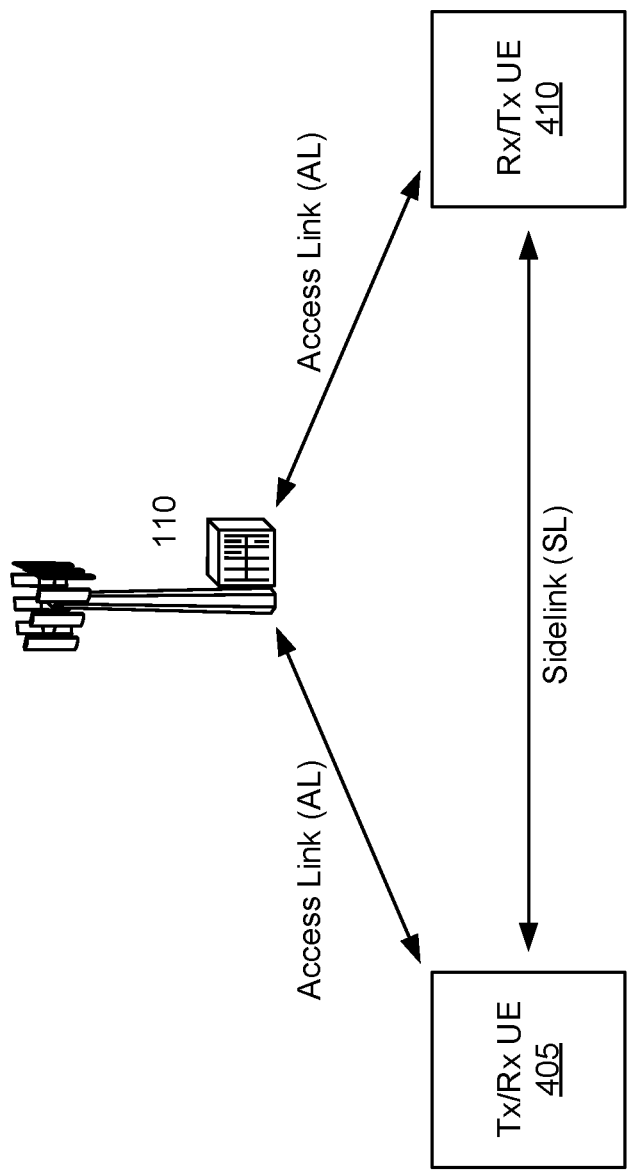
FIG. 4 is a diagram illustrating an example of sidelink communications and access link communications, in accordance with the present disclosure

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In the context of vehicular-based communications (e.g., communications between vehicular UEs and RSUs), UEs may communicate with one another using sidelink channels (e.g., via V2X) in sidelink positioning sessions. A sidelink positioning session is a sidelink communication session that may enable UEs to communicate with one another for various positioning functions, such as navigation, maneuvering, collision avoidance, and/or the like. For example, UEs may transmit and/or receive position reference signals (PRSs) with other UEs, including other RSUs, and exchange measurement information with the other UEs. This technique may be useful in various situations (e.g., where satellite navigation signals are degraded or unavailable (e.g., tunnels, urban canyons, and/or the like)), and may also enhance range and position accuracy when satellite navigation signals are available.

As indicated above, FIG. 4 is provided as an example. Other examples may differ from what is described with respect to FIG. 4.

Managing which UEs (e.g., RSUs or other types of UE) serve other UEs (e.g., vehicular UEs) during sidelink positioning sessions is a function of UE motion state, traffic density, vehicle route, and/or the like. In congested environments, many UEs may attempt to communicate with an RSU or other UE simultaneously in order to determine position. Similarly, the network may seek to establish sidelink positioning sessions simultaneously with many UEs (e.g., to more accurately establish the corresponding vehicles' positions in order to manage vehicle maneuvers and traffic). In environments where UEs are moving, they may rapidly pass from the coverage region of different RSUs and/or be simultaneously in the coverage of multiple RSUs. Adjacent UEs moving at different speeds may further complicate which RSU is best suited to serve a UE. Permitting each UE to unilaterally initiate a sidelink positioning session to its peer UEs or to RSUs may result in collisions, over-the-air (OTA) congestion, rapid transitions between RSUs, and reduce the likelihood of successful session establishment.

Some techniques and apparatuses described herein enable one or more network devices to use information associated with the route of a UE to assign one or more RSUs to the UE for the purpose of sidelink positioning. For example, a UE may transmit route information to another communication device associated with a wireless network (e.g., an RSU, a base station, another UE, and/or the like). The communication device (e.g., via network controller, the base station, an RSU, and/or the like) may use the route information (and potentially additional route information gathered from other devices) to determine which RSU(s) should be assigned to the UE. The communication device may transmit, to the UE (e.g., based on the route of the UE), information indicating the RSU(s) assigned to the UE for sidelink positioning. In this way, the communication device provides a predictive assignment of one or more RSUs to the UE, which may lead to more efficient use of RSUs, OTA resources, and processing resources of both the UEs and RSUs. In addition, the RSU assignments may reduce the likelihood of collision among positioning sessions and provides a mechanism to efficiently manage which RSU(s) are to establish sidelink positioning sessions with which UEs.

Figure 5:
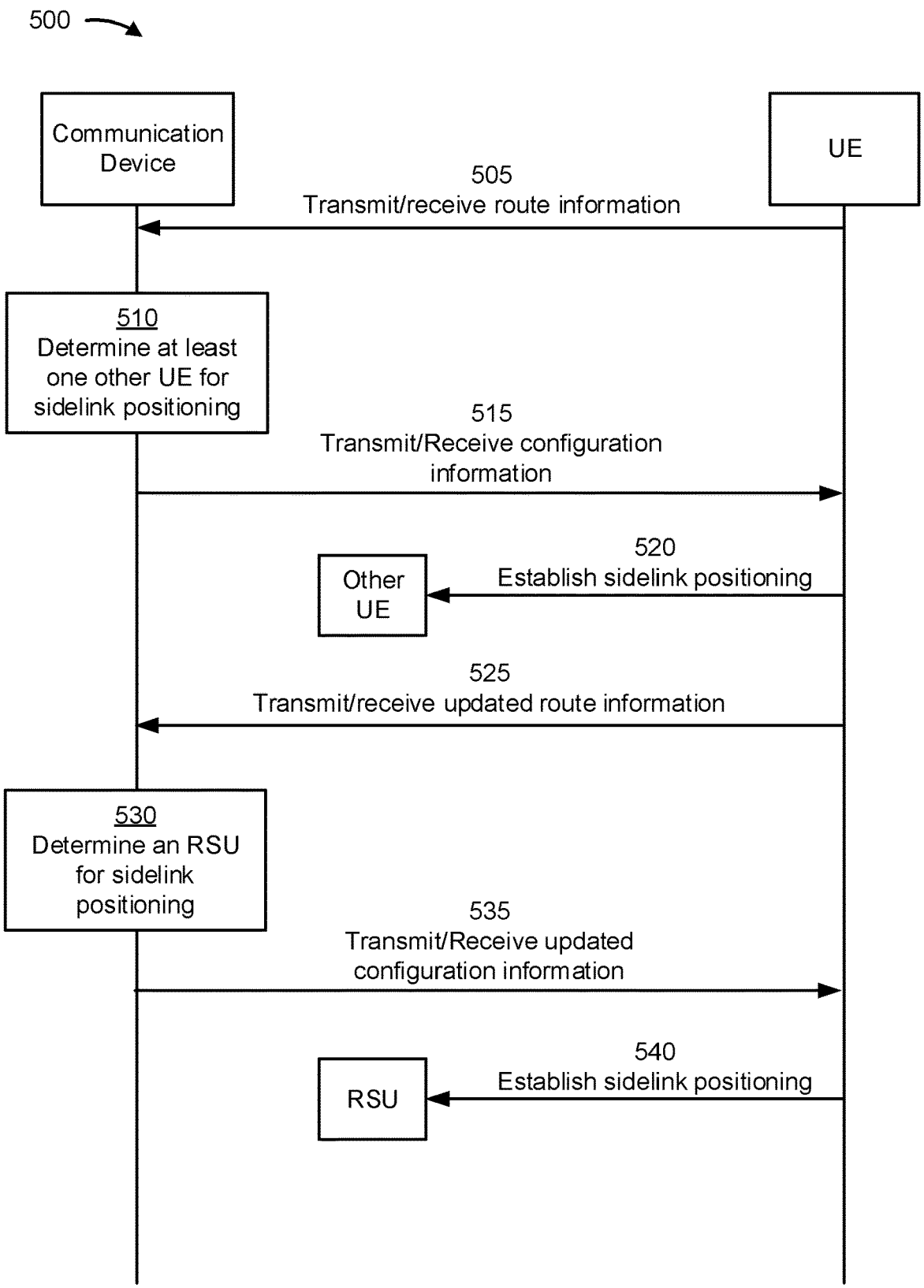
FIG. 5 is a diagram illustrating an example associated with route-based sidelink communication assignments, in accordance with the present disclosure.

FIG. 5 is a diagram illustrating an example 500 associated with route-based sidelink communication assignments, in accordance with the present disclosure. As shown in FIG. 5, a UE (e.g., UE 120) may communicate (e.g., transmit an uplink transmission and/or receive a downlink transmission) with a communication device (e.g., base station 110, network controller 130). In some aspects, the communication device may include another UE (e.g., an RSU or another type of UE), and the UE may communicate with the communication device via one or more sidelink communications. In some aspects, the UE may communicate with the communication device via another UE (e.g., an RSU or another type of UE) via one or more sidelink communications (e.g., in addition to, or in place of, communicating with the communication device). The UE and the communication device may be part of a wireless network (e.g., wireless network 100).

As shown by reference number 505, the UE may transmit, and the communication device may receive, route information indicating a route associated with the UE. In some aspects, the transmission of the route information may be direct (e.g., to a base station or to another UE or an RSU via sidelink) or indirect (e.g., to a base station or network controller, via one or more other devices associated with the network). In some aspects, the communication device may receive route information from a device other than the UE. For example, the communication device may receive route information from another UE, an RSU, or a third party device associated with the UE.

In some aspects, the route information may indicate a destination of the UE (e.g., a destination address, coordinates, and/or the like), an intended route of the UE (e.g., navigation instructions), a speed of the UE, a heading of the UE, one or more location coordinates of the UE, a location topology associated with the UE (e.g., road topology, geographic area topology, and/or the like), location conditions associated with the UE (e.g., weather conditions, wireless signal quality conditions, obstacles, and/or the like), static vehicle characteristics (e.g., parked vehicle locations) associated with the UE, dynamic vehicle characteristics (e.g., moving vehicle locations, bearings, and/or the like) associated with the UE, one or more traffic patterns (e.g., current congestion, predicted congestion, and/or the like) associated with the UE, and/or one or more traffic signal schedules associated with the UE.

As described herein, the route information may be transmitted to the communication device (e.g., periodically and/or on demand) from a variety of sources that might have the route information available. For example, the route information may be transmitted to the communication device via the UE, another UE, an RSU, and/or a third party device associated with the UE. A third party device may include, for example, a computing device capable of providing route information that might be relevant to determining an intended route of the UE and determining what the conditions along the intended route might be. For example, the third party device may be a weather server capable of providing weather conditions along the intended route of the UE, a navigation server capable of providing the intended route of the UE, and/or a geological information server capable of providing topographical information along the intended route of the UE, among other examples.

As shown by reference number 510, the communication device may determine, based at least in part on the route information, at least one other UE (e.g., RSUs and/or other UEs) to be assigned to the UE for sidelink positioning. For example, given the route information indicating the route associated with the UE, the communication device may be aware of the locations, capacity, and coverage areas of UEs, including RSUs, that may be available for sidelink positioning sessions. While any type of UE may be selected for assignment, in some aspects, selection of RSUs may be preferred. For example, due to the static (e.g., stationary) nature and location (e.g., roadside) of many RSUs, as opposed to the dynamic nature and locations of other types of UEs, RSUs may be preferred UEs for sidelink positioning purposes.

In some aspects, the communication device may determine a single RSU to be assigned to the UE for a sidelink positioning session. For example, based on the route information, the communication device may select a single RSU, among multiple RSUs, that satisfies one or more criteria, such as an RSU capacity threshold, an RSU distance threshold, and/or the like. In some aspects, the communication device may determine multiple RSUs to be assigned to the UE for multiple sidelink positioning sessions (e.g., concurrent sessions along an intended route of the UE).

In some aspects, the communication device may determine the RSU(s) to assign based at least in part on a trajectory and/or speed of the UE (e.g., current trajectory and/or speed, and/or predicted trajectory and/or speed, based at least in part on the route). For example, in a situation where the communication device determines, based on the trajectory and/or speed of the vehicle, that the UE will leave the coverage area of a first RSU and enter the coverage area of a second RSU, the communication device may determine to assign the second RSU to the UE. In some aspects, the communication device may select a non-RSU type of UE for a sidelink positioning session (e.g., based on availability (or lack thereof) of RSUs along the route of the UE).

In some aspects, when selecting another UE or an RSU, relative positioning between the other UE and the UE, or between the RSU and the UE, may also be a factor in determining which RSU or other type of UE to select for sidelink positioning. For example, another UE traveling in the same direction of the UE may not provide sufficient relative displacement for accurate and/or precise measurements for sidelink positioning, whereas a stationary RSU or another UE traveling in a different direction from the UE may be more preferred based on the relative displacement being capable of providing more accurate and/or precise measurements for sidelink positioning. Any combination of the foregoing factors and/or criteria, or other relevant factors and/or criteria, may be used by the communication device to determine the at least one other UE (e.g., RSU) to assign to the UE for sidelink positioning.

As shown by reference number 515, the communication device may transmit, and the UE may receive, based at least in part on the route information, configuration information indicating at least one other UE assigned to the UE for sidelink positioning. For example, the communication device may transmit, to the UE, information identifying an RSU or another UE with which the UE is to establish a sidelink positioning session.

In some aspects, the UE may receive configuration information from another device (e.g., from another communication device). For example, the communication device may transmit the configuration information to the UE via a base station, an RSU, or another UE. In some aspects, the UE may receive the configuration information via RRC signaling and/or medium access control (MAC) signaling (e.g., MAC control elements (MAC CEs)). In some aspects, the UE may receive the configuration information as application layer data. In some aspects, the configuration information may include an indication of one or more configuration parameters (e.g., already known to the UE) for selection by the UE and/or explicit configuration information for the UE to use to configure the UE.

In some aspects, the configuration information may indicate that the UE is to establish a sidelink positioning session with another UE (e.g., an RSU) indicated by the configuration information. For example, the UE may be configured to attempt to establish a sidelink positioning session based at least in part on receiving the configuration information (e.g., in response to receiving the configuration information). In some aspects, the configuration information may indicate multiple UEs and/or RSUs. For example, the configuration information may indicate a list of multiple UEs and/or RSUs, and an order in which the UE is to establish sidelink positioning sessions with the UEs and/or RSUs on the list.

As shown by reference number 520, the UE may transmit, based at least in part on the configuration information indicating the at least one UE, data associated with establishing a sidelink positioning session to a UE of the at least one UE. For example, the UE may establish sidelink communications with an RSU identified in the configuration information, as described herein.

In some aspects, the UE may switch from a sidelink positioning session with one RSU to another RSU. For example, based at least in part on the configuration information identifying multiple RSUs and providing a method of determining an order of the RSUs, as described herein, the UE may switch from a first RSU to a second RSU (e.g., based on leaving the coverage area of the first RSU, entering the coverage area of the second RSU, based on a time and/or location-based trigger, among other examples).

As shown by reference number 525, the UE may transmit, and the communication device may receive, updated route information (e.g., in manner similar to that described herein) indicated an updated route associated with the UE. For example, in a situation where route information associated with the UE changes (e.g., UE changes a route, traffic changes, weather changes, and/or the like), the updated route information may be provided to the communication device.

As shown by reference number 530, the communication device may determine an RSU for sidelink positioning based at least in part on the updated route information (e.g., in a manner similar to that described herein). For example, in a situation where the UE's route changes, the RSU assignment may also need to be updated.

As shown by reference number 535, the communication device may transmit, and the UE may receive, based at least in part on the updated route information, updated configuration information indicating an RSU assigned to the UE for sidelink positioning (e.g., in a manner similar to that described herein). For example, in a situation where the RSU assignment changed based on the updated route information, the communication device may transmit the updated assignment information to the UE in the configuration information.

As shown by reference number 540, the UE may transmit, based at least in part on the updated configuration information indicating the RSU, data associated with establishing a sidelink positioning session to the RSU (e.g., in a manner similar to that described herein). For example, the UE may establish sidelink communications with the RSU identified in the updated configuration information, as described herein.

As indicated above, FIG. 5 is provided as an example. Other examples may differ from what is described with regard to FIG. 5.

Figure 6:
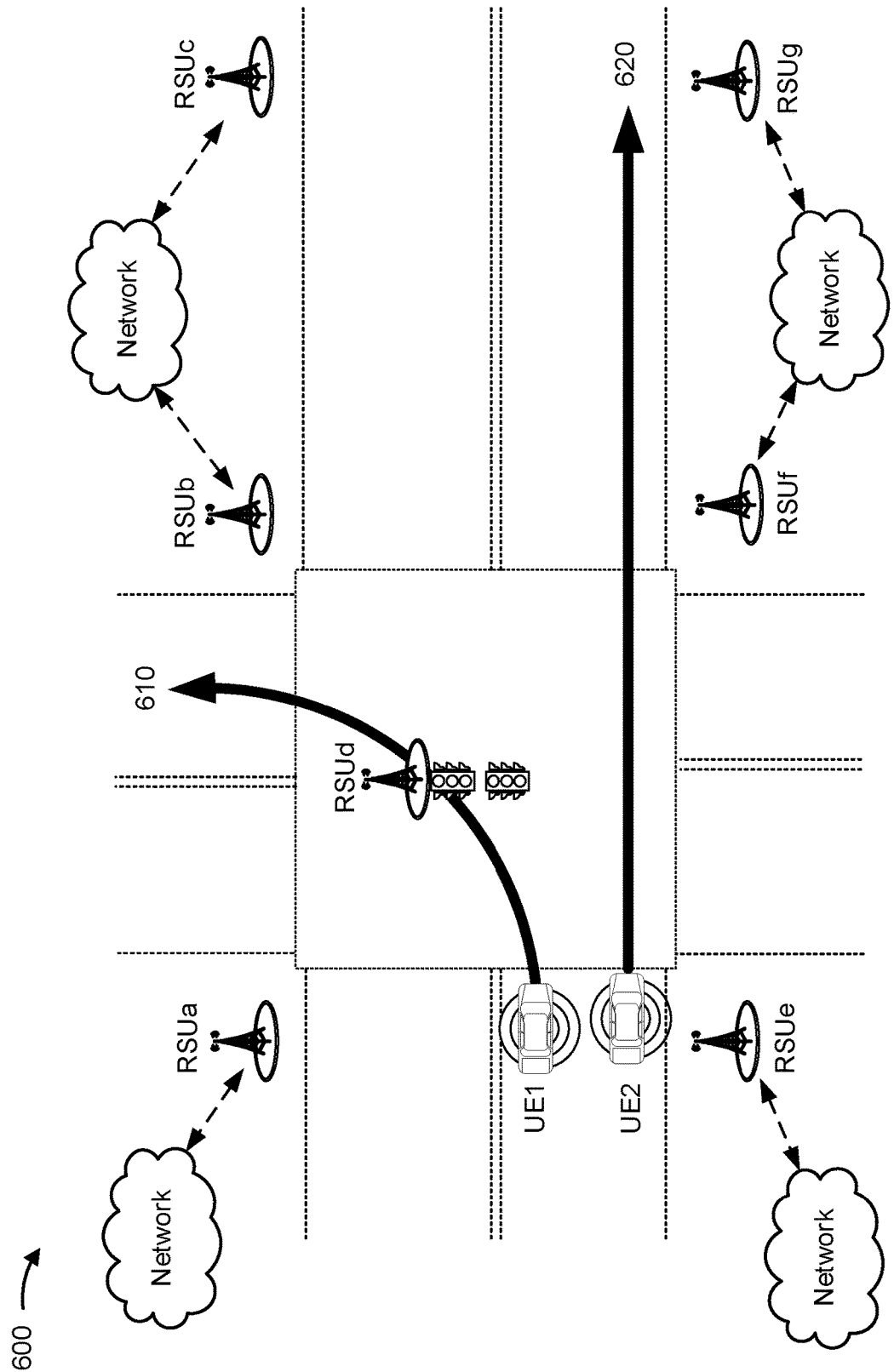
FIGS. 6 and 7 are diagrams illustrating examples of sidelink positioning, in accordance with the present disclosure.

FIG. 6 is a diagram illustrating an example 600 of sidelink positioning, in accordance with the present disclosure. As shown in FIG. 6, UEs 120 associated with vehicles (e.g., UE1 and UE2 associated with corresponding first and second vehicles) may communicate with one another and/or with one or more RSUs 120*f* (e.g., RSUa-RSUg) via sidelink communications. The RSUs may be in wired and/or wireless communication with a network (e.g., wireless network 100). While not depicted in the example 600, the UEs and/or RSUs may also be in communication with one or more other devices, such as base station 110, network controller 130, and/or third party device 135 of wireless network 100.

As shown in example 600, UE1 may be associated with a first route 610 turning left through an intersection, while UE2 may be associated with a second route 620 continuing straight through the intersection. Using route information associated with a route of each UE, one or more devices of the network (e.g., an RSU, a base station, network controller, and/or another UE, among other examples) may assign one or more RSUs to UE1 and/or UE2. For example, based on the intended route of UE1, UE1 may be assigned to communicate with RSUs along the intended route, such as RSUd (e.g., associated with the intersection signal) and then RSUb (e.g., associated with a corner of the intersection). As another example, based on the intended route of UE2, UE2 may be assigned to communicate with RSUf, followed by RSUg. By assigning RSUs to UEs based on route information, the UEs may be assigned to RSUs in a manner designed to reduce the likelihood of collision among sidelink positioning sessions and in a manner designed to select RSUs more likely to provide higher quality sidelink positioning sessions for the UEs.

As indicated above, FIG. 6 is provided as an example. Other examples may differ from what is described with respect to FIG. 6.

Figure 7:
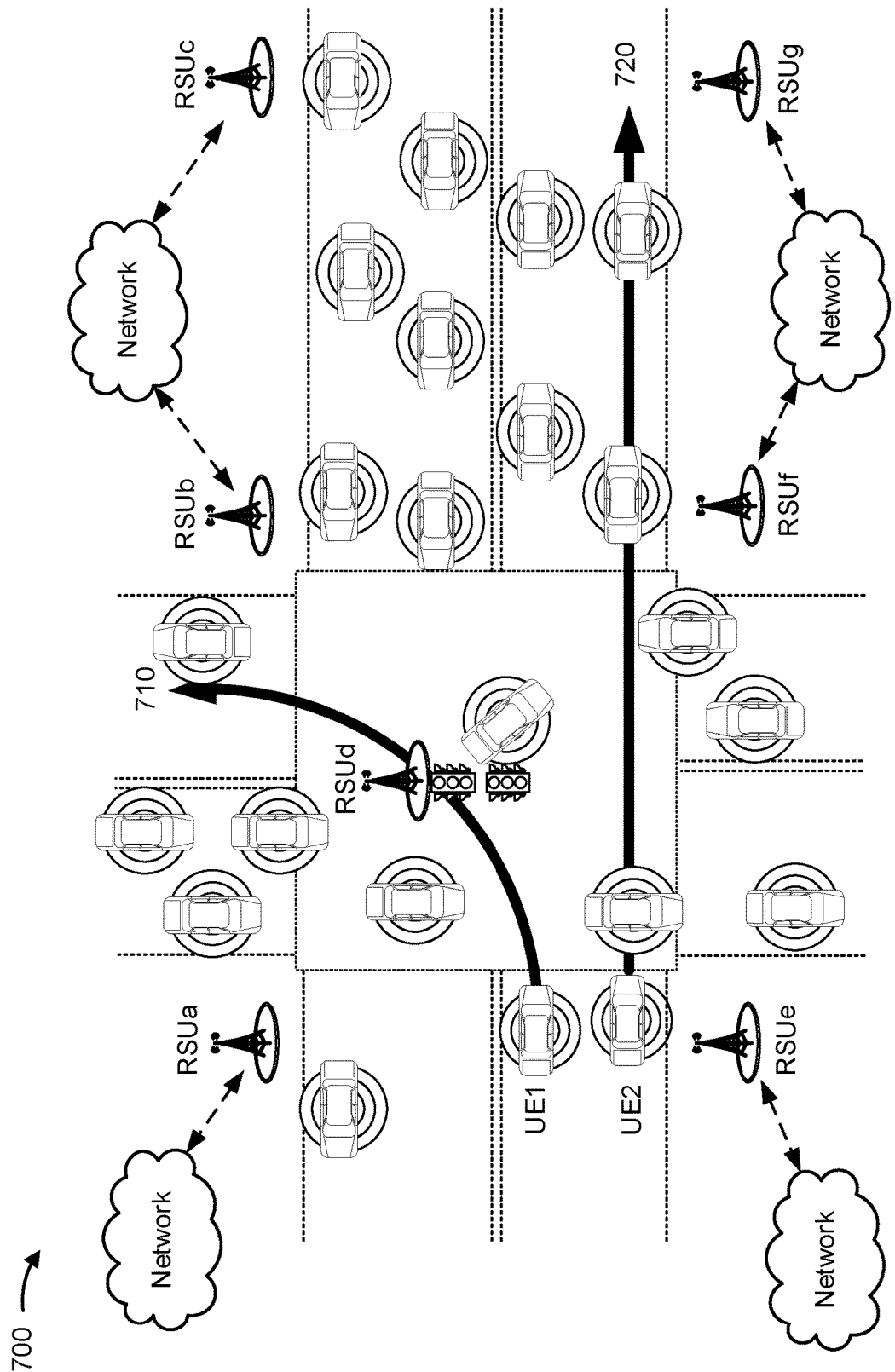

FIG. 7 is a diagram illustrating another example 700 of sidelink positioning, in accordance with the present disclosure. FIG. 7 depicts conditions similar to those depicted in FIG. 6; however, the example 700 includes many vehicles in addition to the vehicles to which UE1 and UE2 correspond.

As shown in example 700, UE1 may be associated with a first route 710 turning left through an intersection, while UE2 may be associated with a second route 720 continuing straight through the intersection. Using route information associated with a route of each UE, including information indicating the traffic conditions shown in example 700, one or more devices of the network (e.g., an RSU, a base station, network controller, and/or another UE, among other examples) may assign one or more RSUs to UE1 and/or UE2. The RSU assignments in example 700 may differ from those in example 600 (e.g., based on the difference in traffic conditions depicted in the two examples). For example, based on the intended route of UE1 and the traffic conditions near the intersection, UE1 may be assigned to communicate with RSUa through the intersection (e.g., in a situation where RSUa may be managing fewer sidelink positioning sessions than other depicted RSUs). As another example, based on the intended route of UE2 and the traffic conditions near the intersection, UE2 may be assigned to communicate with RSUe first, followed by RSUg, skipping RSUf in a situation where RSUf is managing a relatively high number of sidelink positioning sessions. As shown, one or more methods described herein may enable dynamic RSU assignments based on both static and dynamic route information, enabling different RSU assignments for different conditions (e.g., traffic conditions, weather conditions, and/or the like), which may reduce the likelihood of collision among sidelink positioning sessions and may lead to higher quality sidelink positioning sessions for the UEs.

As indicated above, FIG. 7 is provided as an example. Other examples may differ from what is described with respect to FIG. 7.

Some techniques and apparatuses described herein enable one or more network devices to use information associated with the route of a UE to assign one or more RSUs to the UE for the purpose of sidelink positioning. For example, a UE may transmit route information to another communication device associated with a wireless network (e.g., an RSU, a base station, another UE, and/or the like). The communication device (e.g., via network controller, the base station, an RSU, and/or the like) may use the route information (and potentially additional route information gathered from other devices) to determine which RSU(s) should be assigned to the UE. The communication device may transmit, to the UE (e.g., based on the route of the UE), information indicating the RSU(s) assigned to the UE for sidelink positioning. In this way, the communication device provides a predictive assignment of one or more RSUs to the UE, which may lead to more efficient use of RSUs, OTA resources, and processing resources of both the UEs and RSUs. In addition, the RSU assignments may reduce the likelihood of collision among positioning sessions and provide a mechanism to efficiently manage which RSU(s) are to establish sidelink positioning sessions with which UEs.

Figure 8:
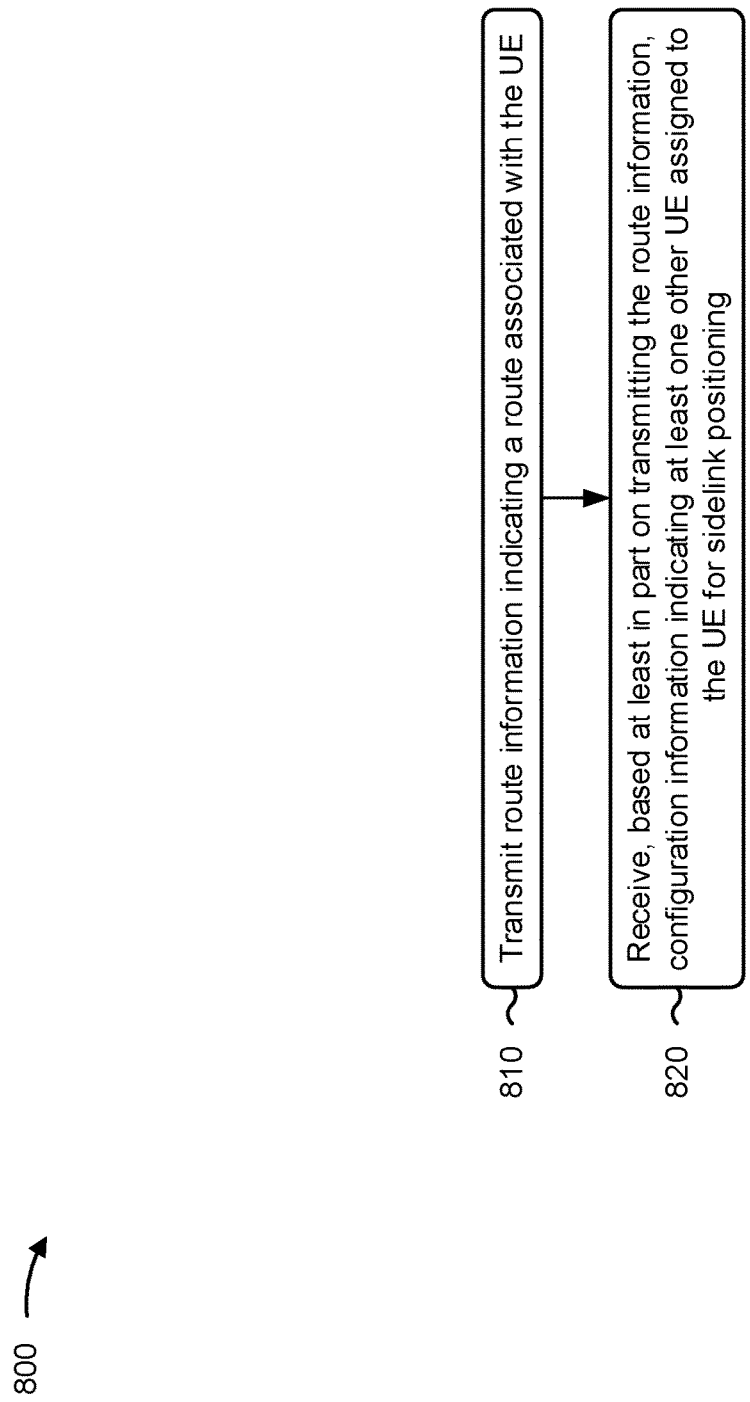
FIGS. 8 and 9 are diagrams illustrating example processes associated with route-based sidelink communication assignments, in accordance with the present disclosure.

FIG. 8 is a diagram illustrating an example process 800 performed, for example, by a UE, in accordance with the present disclosure. Example process 800 is an example where the UE (e.g., UE 120) performs operations associated with route-based sidelink communication assignments.

As shown in FIG. 8, in some aspects, process 800 may include transmitting route information indicating a route associated with the UE (block 810). For example, the UE (e.g., using communication manager 140 and/or transmission component 1004, depicted in FIG. 10) may transmit route information indicating a route associated with the UE, as described above.

As further shown in FIG. 8, in some aspects, process 800 may include receiving, based at least in part on transmitting the route information, configuration information indicating at least one other UE assigned to the UE for sidelink positioning (block 820). For example, the UE (e.g., using communication manager 140 and/or reception component 1002, depicted in FIG. 10) may receive, based at least in part on transmitting the route information, configuration information indicating at least one other UE assigned to the UE for sidelink positioning, as described above.

Process 800 may include additional aspects, such as any single aspect or any combination of aspects described below and/or in connection with one or more other processes described elsewhere herein.

In a first aspect, transmitting the route information comprises transmitting the route information to at least one of a base station, an RSU, or another UE.

In a second aspect, alone or in combination with the first aspect, receiving the configuration information comprises receiving the configuration information from at least one of a base station, an RSU, or another UE.

In a third aspect, alone or in combination with one or more of the first and second aspects, receiving the configuration information comprises receiving the configuration information via one or more of RRC signaling, a MAC-CE, or application layer data.

In a fourth aspect, alone or in combination with one or more of the first through third aspects, process 800 includes transmitting, based at least in part on the configuration information indicating the at least one UE, data associated with establishing a sidelink positioning session to a UE of the at least one UE.

In a fifth aspect, alone or in combination with one or more of the first through fourth aspects, the at least one other UE includes at least one RSU.

In a sixth aspect, alone or in combination with one or more of the first through fifth aspects, the route information indicates at least one of a destination of the UE, an intended route of the UE, a speed of the UE, a heading of the UE, or one or more location coordinates of the UE.

In a seventh aspect, alone or in combination with one or more of the first through sixth aspects, process 800 includes receiving updated configuration information indicating an RSU assigned to the UE, and transmitting, based at least in part on the updated configuration information indicated the RSU, data associated with establishing a connection to the RSU.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
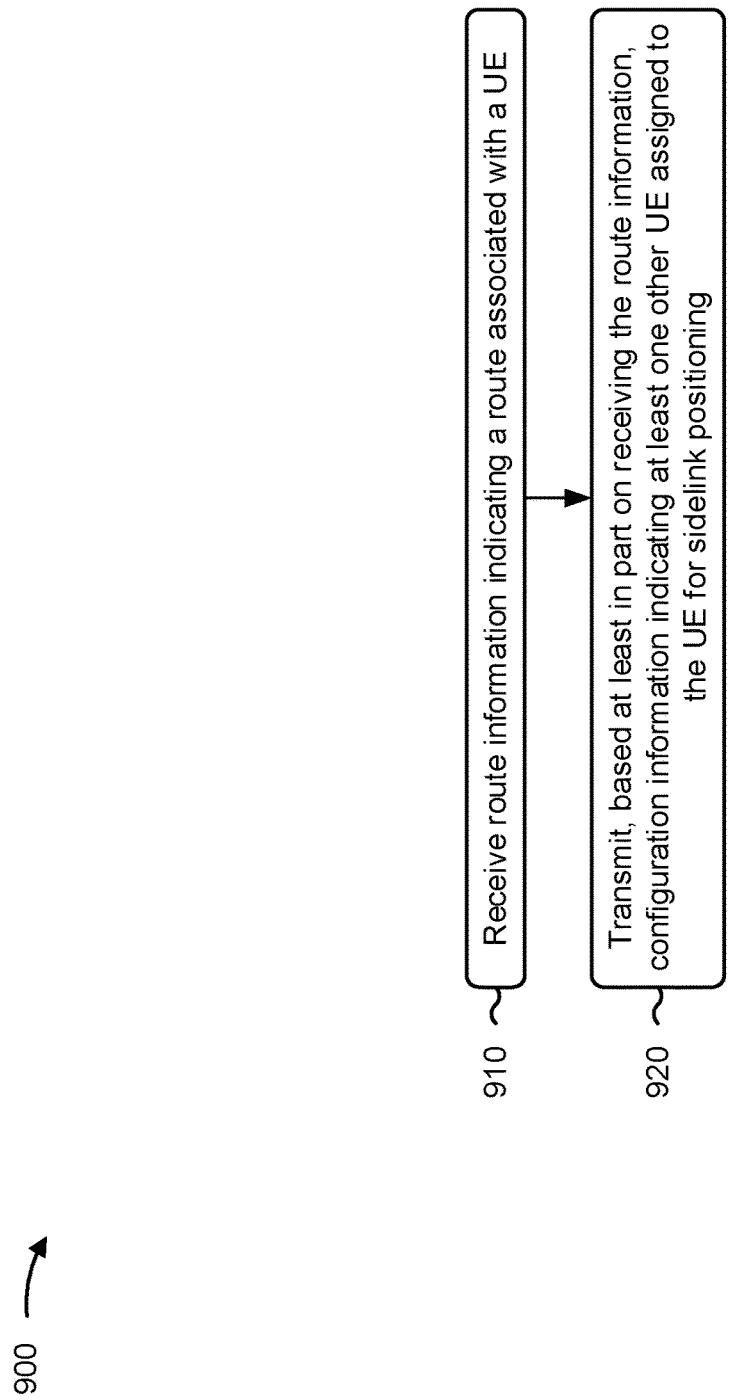

FIG. 9 is a diagram illustrating an example process 900 performed, for example, by a communication device, in accordance with the present disclosure. Example process 900 is an example where the communication device (e.g., base station 110, UE 120, and/or network controller 130) performs operations associated with route-based sidelink communication assignments.

As shown in FIG. 9, in some aspects, process 900 may include receiving route information indicating a route associated with a UE (block 910). For example, the communication device (e.g., using communication manager 140/150 and/or reception component 1102, depicted in FIG. 11) may receive route information indicating a route associated with a UE, as described above.

As further shown in FIG. 9, in some aspects, process 900 may include transmitting, based at least in part on receiving the route information, configuration information indicating at least one other UE assigned to the UE for sidelink positioning (block 920). For example, the communication device (e.g., using communication manager 140/150 and/or transmission component 1104, depicted in FIG. 11) may transmit, based at least in part on receiving the route information, configuration information indicating at least one other UE assigned to the UE for sidelink positioning, as described above.

Process 900 may include additional aspects, such as any single aspect or any combination of aspects described below and/or in connection with one or more other processes described elsewhere herein.

In a first aspect, process 900 includes determining, based at least in part on the route information, the at least one other UE.

In a second aspect, alone or in combination with the first aspect, the route information indicates at least one of a destination of the UE, an intended route of the UE, a speed of the UE, a heading of the UE, one or more location coordinates of the UE, a location topology associated with the UE, location conditions associated with the UE, static vehicle characteristics associated with the UE, dynamic vehicle characteristics associated with the UE, one or more traffic patterns associated with the UE, or one or more traffic signal schedules associated with the UE.

In a third aspect, alone or in combination with one or more of the first and second aspects, process 900 includes receiving the route information from at least one of the UE, another UE, a RSU, or a third party device associated with the UE.

In a fourth aspect, alone or in combination with one or more of the first through third aspects, process 900 includes receiving updated route information indicating an updated route of the UE, and transmitting, based at least in part on receiving the updated route information, updated configuration information indicating an RSU assigned to the UE for sidelink positioning.

In a fifth aspect, alone or in combination with one or more of the first through fourth aspects, the at least one other UE includes at least one RSU.

In a sixth aspect, alone or in combination with one or more of the first through fifth aspects, the communication device comprises one of a base station, another UE, an RSU, or a network controller.

In a seventh aspect, alone or in combination with one or more of the first through sixth aspects, transmitting the configuration information comprises transmitting the configuration information via one or more of RRC signaling, a MAC-CE, or application layer data.

In an eighth aspect, alone or in combination with one or more of the first through seventh aspects, transmitting the configuration information comprises transmitting the configuration information to the UE.

In a ninth aspect, alone or in combination with one or more of the first through eighth aspects, transmitting the configuration information to the UE comprises transmitting the configuration information to the UE via one or more of a base station, an RSU, or another UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
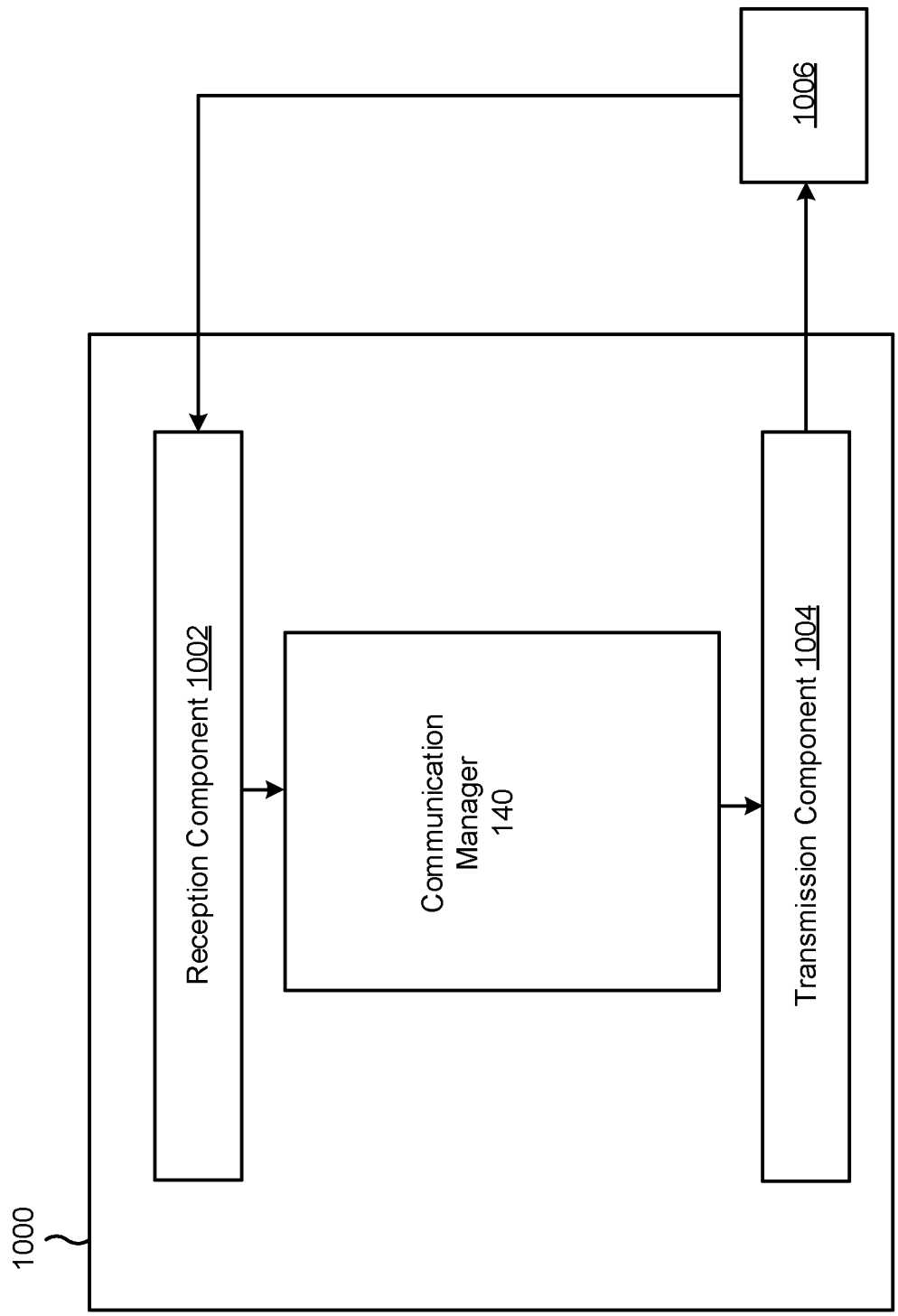
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit route information indicating a route associated with the UE. The reception component 1002 may receive, based at least in part on transmitting the route information, configuration information indicating at least one other UE assigned to the UE for sidelink positioning.

The transmission component 1004 may transmit, based at least in part on the configuration information indicating the at least one UE, data associated with establishing a sidelink positioning session to a UE of the at least one UE.

The reception component 1002 may receive updated configuration information indicating an RSU assigned to the UE.

The transmission component 1004 may transmit, based at least in part on the updated configuration information indicated the RSU, data associated with establishing a connection to the RSU.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
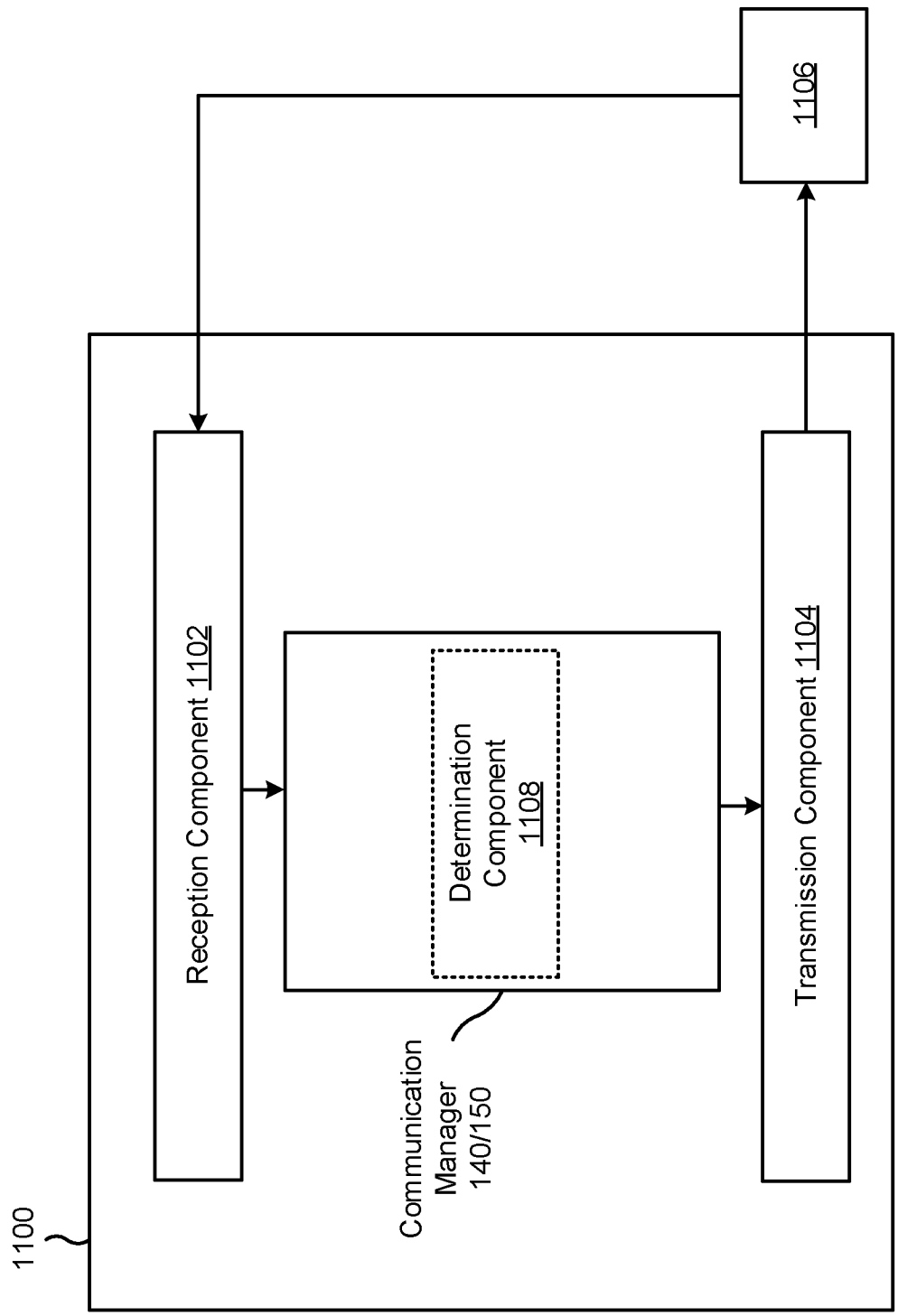

FIG. 11 is a diagram of an example apparatus 1100 for wireless communication. The apparatus 1100 may be a communication device (e.g., a UE, a base station, a network controller, or another communication device), or a communication device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager (e.g., communication manager 140 or 150). The communication manager 140/150) may include a determination component 1108, among other examples.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9.

In some aspects, the apparatus 1100 and/or one or more components shown in FIG. 11 may include one or more components of the communication device described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the communication device described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the communication device described in connection with FIG. 2. In some aspects, the transmission component 1104 may be co-located with the reception component 1102 in a transceiver.

The reception component 1102 may receive route information indicating a route associated with a UE. The transmission component 1104 may transmit, based at least in part on receiving the route information, configuration information indicating at least one other UE assigned to the UE for sidelink positioning.

The determination component 1108 may determine, based at least in part on the route information, the at least one other UE.

The reception component 1102 may receive the route information from at least one of the UE, another UE, a RSU, or a third party device associated with the UE.

The reception component 1102 may receive updated route information indicating an updated route of the UE.

The transmission component 1104 may transmit, based at least in part on receiving the updated route information, updated configuration information indicating an RSU assigned to the UE for sidelink positioning.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: transmitting route information indicating a route associated with the UE; and receiving, based at least in part on transmitting the route information, configuration information indicating at least one other UE assigned to the UE for sidelink positioning.

Aspect 2: The method of Aspect 1, wherein transmitting the route information comprises transmitting the route information to at least one of: a base station, an RSU, or another UE.

Aspect 3: The method of any of Aspects 1-2, wherein receiving the configuration information comprises receiving the configuration information from at least one of: a base station, an RSU, or another UE.

Aspect 4: The method of any of Aspects 1-3, wherein receiving the configuration information comprises receiving the configuration information via one or more of: RRC signaling, a MAC-CE, or application layer data.

Aspect 5: The method of any of Aspects 1-4, further comprising: transmitting, based at least in part on the configuration information indicating the at least one UE, data associated with establishing a sidelink positioning session to a UE of the at least one UE.

Aspect 6: The method of any of Aspects 1-5, wherein the at least one other UE includes at least one RSU.

Aspect 7: The method of any of Aspects 1-6, wherein the route information indicates at least one of: a destination of the UE, an intended route of the UE, a speed of the UE, a heading of the UE, or one or more location coordinates of the UE.

Aspect 8: The method of any of Aspects 1-7, further comprising: receiving updated configuration information indicating an RSU assigned to the UE; and transmitting, based at least in part on the updated configuration information indicated the RSU, data associated with establishing a connection to the RSU.

Aspect 9: A method of wireless communication performed by a communication device, comprising: receiving route information indicating a route associated with a UE; and transmitting, based at least in part on receiving the route information, configuration information indicating at least one other UE assigned to the UE for sidelink positioning.

Aspect 10: The method of Aspect 9, further comprising: determining, based at least in part on the route information, the at least one other UE.

Aspect 11: The method of any of Aspects 9-10, wherein the route information indicates at least one of: a destination of the UE, an intended route of the UE, a speed of the UE, a heading of the UE, one or more location coordinates of the UE, a location topology associated with the UE, location conditions associated with the UE, static vehicle characteristics associated with the UE, dynamic vehicle characteristics associated with the UE, one or more traffic patterns associated with the UE, or one or more traffic signal schedules associated with the UE.

Aspect 12: The method of any of Aspects 9-11, further comprising: receiving the route information from at least one of: the UE, another UE, an RSU, or a third party device associated with the UE.

Aspect 13: The method of any of Aspects 9-12, further comprising: receiving updated route information indicating an updated route of the UE; and transmitting, based at least in part on receiving the updated route information, updated configuration information indicating an RSU assigned to the UE for sidelink positioning.

Aspect 14: The method of any of Aspects 9-13, wherein the at least one other UE includes at least one RSU.

Aspect 15: The method of any of Aspects 9-14, wherein the communication device comprises one of: a base station, another UE, an RSU, or a network controller.

Aspect 16: The method of any of Aspects 9-15, wherein transmitting the configuration information comprises transmitting the configuration information via one or more of: RRC signaling, a MAC-CE, or application layer data.

Aspect 17: The method of any of Aspects 9-16, wherein transmitting the configuration information comprises: transmitting the configuration information to the UE.

Aspect 18: The method of Aspect 17, wherein transmitting the configuration information to the UE comprises transmitting the configuration information to the UE via one or more of: a base station, an RSU, or another UE.

Aspect 19: An apparatus for wireless communication at a device, comprising a processor; memory coupled with the processor; and instructions stored in the memory and executable by the processor to cause the apparatus to perform the method of one or more of Aspects 1-8.

Aspect 20: An apparatus for wireless communication at a device, comprising a processor; memory coupled with the processor; and instructions stored in the memory and executable by the processor to cause the apparatus to perform the method of one or more of Aspects 9-18.

Aspect 21: A device for wireless communication, comprising a memory and one or more processors coupled to the memory, the one or more processors configured to perform the method of one or more of Aspects 1-8.

Aspect 22: A device for wireless communication, comprising a memory and one or more processors coupled to the memory, the one or more processors configured to perform the method of one or more of Aspects 9-18.

Aspect 23: An apparatus for wireless communication, comprising at least one means for performing the method of one or more of Aspects 1-8.

Aspect 24: An apparatus for wireless communication, comprising at least one means for performing the method of one or more of Aspects 9-18.

Aspect 25: A non-transitory computer-readable medium storing code for wireless communication, the code comprising instructions executable by a processor to perform the method of one or more of Aspects 1-8.

Aspect 26: A non-transitory computer-readable medium storing code for wireless communication, the code comprising instructions executable by a processor to perform the method of one or more of Aspects 9-18.

Aspect 27: A non-transitory computer-readable medium storing a set of instructions for wireless communication, the set of instructions comprising one or more instructions that, when executed by one or more processors of a device, cause the device to perform the method of one or more of Aspects 1-8.

Aspect 28: A non-transitory computer-readable medium storing a set of instructions for wireless communication, the set of instructions comprising one or more instructions that, when executed by one or more processors of a device, cause the device to perform the method of one or more of Aspects 9-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      transmit route information indicating a route associated with the UE; and
      receive, based at least in part on transmitting the route information, configuration information indicating at least one other UE assigned to the UE for communicating position reference signals and exchanging measurement information.

2. The UE of claim 1, wherein the one or more processors, to transmit the route information, are configured to transmit the route information to at least:
   a base station,
   a roadside unit (RSU),
   another UE, or
   some combination thereof.

3. The UE of claim 1, wherein the one or more processors, to receive the configuration information, are configured to receive the configuration information from at least:
   a base station,
   an RSU,
   another UE, or
   some combination thereof.

4. The UE of claim 1, wherein the one or more processors, to receive the configuration information, are configured to receive the configuration information via at least:
   radio resource control (RRC) signaling,
   a medium access control (MAC) control element (MAC-CE),
   application layer data, or
   some combination thereof.

5. The UE of claim 1, wherein the one or more processors are further configured to:
   transmit, based at least in part on the configuration information indicating the at least one UE, data associated with establishing a sidelink positioning session to a UE of the at least one UE.

6. The UE of claim 1, wherein the at least one other UE includes at least one RSU.

7. The UE of claim 1, wherein the route information indicates at least:
   a destination of the UE,
   an intended route of the UE,
   a speed of the UE,
   a heading of the UE,
   one or more location coordinates of the UE, or
   some combination thereof.

8. The UE of claim 1, wherein the one or more processors are further configured to:
   receive updated configuration information indicating an RSU assigned to the UE; and
   transmit, based at least in part on the updated configuration information indicating the RSU, data associated with establishing a connection to the RSU.

9. A communication device for wireless communication, comprising:
   a memory; and
   one or more processors, coupled to the memory, configured to:
      receive route information indicating a route associated with a user equipment (UE); and
      transmit, based at least in part on receiving the route information, configuration information indicating at least one other UE assigned to the UE for communicating position reference signals and exchanging measurement information.

10. The communication device of claim 9, wherein the one or more processors are further configured to:
    determine, based at least in part on the route information, the at least one other UE.

11. The communication device of claim 9, wherein the route information indicates at least:
    a destination of the UE,
    an intended route of the UE,
    a speed of the UE,
    a heading of the UE,
    one or more location coordinates of the UE,
    a location topology associated with the UE,
    location conditions associated with the UE,
    static vehicle characteristics associated with the UE,
    dynamic vehicle characteristics associated with the UE,
    one or more traffic patterns associated with the UE,
    one or more traffic signal schedules associated with the UE, or
    some combination thereof.

12. The communication device of claim 9, wherein the one or more processors are further configured to:
    receive the route information from at least:
       the UE,
       another UE,
       a roadside unit (RSU),
       a third party device associated with the UE, or
       some combination thereof.

13. The communication device of claim 9, wherein the one or more processors are further configured to:
    receive updated route information indicating an updated route of the UE; and
    transmit, based at least in part on receiving the updated route information, updated configuration information indicating an RSU assigned to the UE for sidelink positioning.

14. The communication device of claim 9, wherein the at least one other UE includes at least one RSU.

15. The communication device of claim 9, wherein the communication device comprises one of:
    a base station,
    another UE,
    an RSU, or
    a network controller.

16. The communication device of claim 9, wherein the one or more processors, to transmit the configuration information, are configured to transmit the configuration information via at least:
    radio resource control (RRC) signaling,
    a medium access control (MAC) control element (MAC-CE),
    application layer data, or
    some combination thereof.

17. The communication device of claim 9, wherein the one or more processors, to transmit the configuration information, are configured to:
transmit the configuration information to the UE.

18. The communication device of claim 17, wherein the one or more processors, to transmit the configuration information to the UE, are configured to transmit the configuration information to the UE via at least:
a base station,
an RSU,
another UE, or
some combination thereof.

19. A method of wireless communication performed by a user equipment (UE), comprising:
transmitting route information indicating a route associated with the UE; and
receiving, based at least in part on transmitting the route information, configuration information indicating at least one other UE assigned to the UE for communicating position reference signals and exchanging measurement information.

20. The method of claim 19, wherein receiving the configuration information comprises receiving the configuration information via at least:
radio resource control (RRC) signaling,
a medium access control (MAC) control element (MAC-CE),
application layer data, or
some combination thereof.

21. The method of claim 19, further comprising:
transmitting, based at least in part on the configuration information indicating the at least one UE, data associated with establishing a sidelink positioning session to a UE of the at least one UE.

22. The method of claim 19, wherein the at least one other UE includes at least one RSU.

23. The method of claim 19, wherein the route information indicates at least:
a destination of the UE,
an intended route of the UE,
a speed of the UE,
a heading of the UE,
one or more location coordinates of the UE, or
some combination thereof.

24. A method of wireless communication performed by a communication device, comprising:
receiving route information indicating a route associated with a user equipment (UE); and
transmitting, based at least in part on receiving the route information, configuration information indicating at least one other UE assigned to the UE for communicating position reference signals and exchanging measurement information.

25. The method of claim 24, further comprising:
determining, based at least in part on the route information, the at least one other UE.

26. The method of claim 24, wherein the route information indicates at least:
a destination of the UE,
an intended route of the UE,
a speed of the UE,
a heading of the UE,
one or more location coordinates of the UE,
a location topology associated with the UE,
location conditions associated with the UE,
static vehicle characteristics associated with the UE,
dynamic vehicle characteristics associated with the UE,
one or more traffic patterns associated with the UE,
one or more traffic signal schedules associated with the UE, or
some combination thereof.

27. The method of claim 24, further comprising:
receiving the route information from at least:
the UE,
another UE,
a roadside unit (RSU),
a third party device associated with the UE, or
some combination thereof.

28. The method of claim 24, further comprising:
receiving updated route information indicating an updated route of the UE; and
transmitting, based at least in part on receiving the updated route information, updated configuration information indicating an RSU assigned to the UE for sidelink positioning.

29. The method of claim 24, wherein the at least one other UE includes at least one RSU.

30. The method of claim 24, wherein the communication device comprises one of:
a base station,
another UE,
an RSU, or
a network controller.

* * * * *